United States Patent [19]

Pawelski

[11] 4,427,604
[45] Jan. 24, 1984

[54] CARBURETOR

[76] Inventor: Donald J. Pawelski, 5971 S. Honeycreek Dr., Greenfield, Wis. 53221

[21] Appl. No.: 351,016
[22] Filed: Feb. 22, 1982
[51] Int. Cl.³ .......................................... F02M 29/04
[52] U.S. Cl. .......................... 261/23 A; 261/DIG. 8; 261/34 A; 261/37; 261/100; 261/DIG. 39; 261/78 R
[58] Field of Search ............ 261/DIG. 8, 23 A, 34 A, 261/37, 100, DIG. 39, 78 R

[56] References Cited

U.S. PATENT DOCUMENTS

| | | | |
|---|---|---|---|
| 1,038,300 | 9/1912 | Crone | 261/DIG. 8 |
| 1,246,727 | 11/1917 | Donning | 261/DIG. 39 |
| 1,280,463 | 10/1918 | Henes | 261/DIG. 8 |
| 1,640,291 | 8/1927 | Perkins | 261/106 |
| 2,996,290 | 8/1961 | Munden | 261/78 R |
| 3,208,738 | 9/1965 | Johnson | 261/34 A |
| 3,883,621 | 5/1975 | Hammerschmied | 261/DIG. 39 |
| 3,917,758 | 11/1975 | Huff | 261/34 A |
| 4,278,618 | 7/1981 | Higashigawa et al. | 261/34 A |
| 4,335,061 | 6/1982 | Kobayashi | 261/DIG. 8 |

FOREIGN PATENT DOCUMENTS 409183 4/1910 France ........................ 261/DIG. 39

Primary Examiner—Tim R. Miles
Attorney, Agent, or Firm—Andrus, Sceales, Starke & Sawall

[57] ABSTRACT

An improved carburetor for an internal combustion engine which eliminates the conventional automatic choke mechanism. A pair of fabric absorbent wicks are suspended in the vaporizing chamber of the carburetor in alignment with the high speed gasoline jets. The wicks partially surround the respective venturis and hang downwardly within the chamber to a level beneath the venturis. On starting of the engine, a manually operated primer pump operates to discharge fuel through the jets into contact with the wicks to thereby saturate the absorbent material. The absorbed fuel is vaporized and drawn along with air into the engine.

10 Claims, 4 Drawing Figures

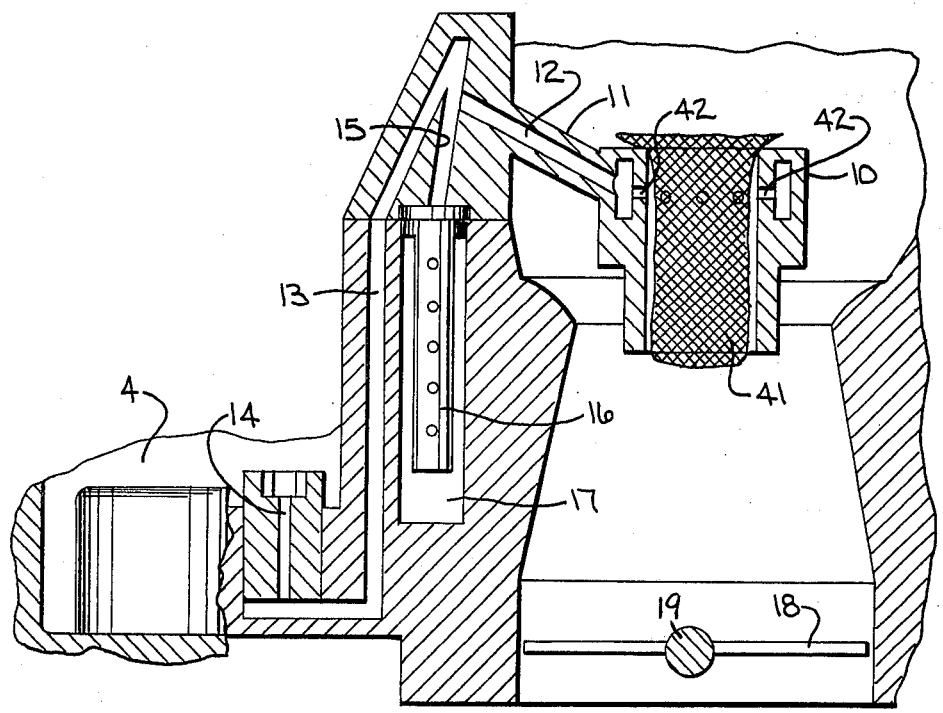
FIG.3
FIG.4
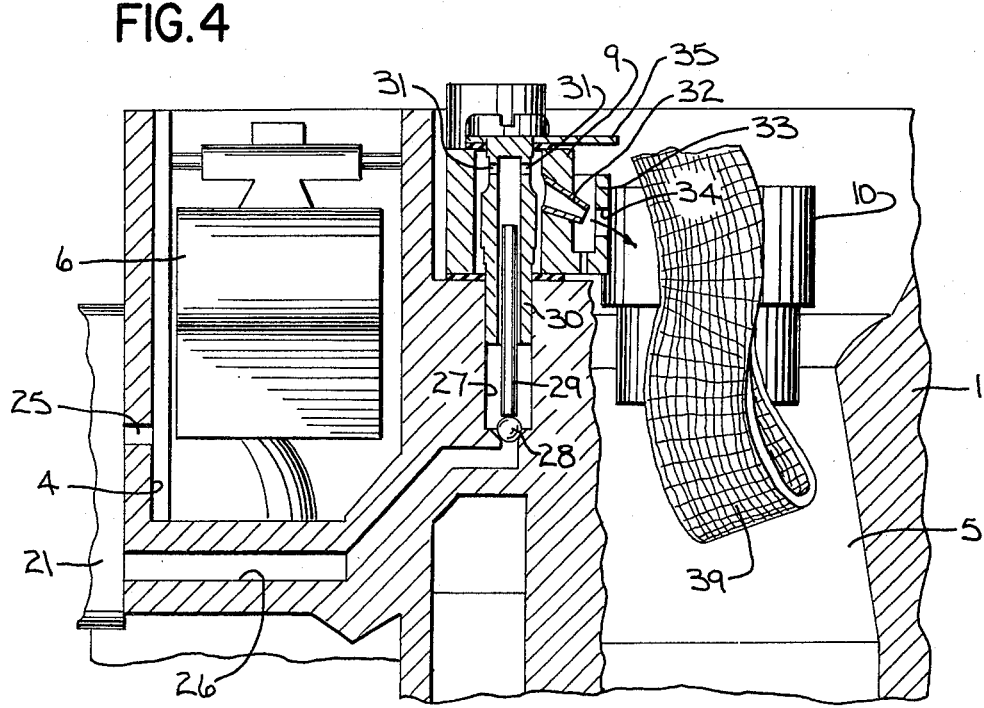

CARBURETOR

BACKGROUND OF THE INVENTION

In a conventional carburetor as used with an internal combustion engine for a vehicle, one of the most troublesome features is the automatic choke mechanism. The automatic choke mechanism normally operates to control the position of the butterfly valve until the engine has achieved a predetermined temperature. If the automatic choke mechanism is not operating properly to close the butterfly valve, a fuel-lean mixture will be supplied to the engine, which can make starting of the engine difficult. On the other hand, if improper operation of the automatic choke mechanism results in the failure to open the butterfly valve after the engine is warm, flooding can occur, as well as excessive use of gasoline, thereby reducing the fuel efficiency of the engine.

Attempts have been made in the past to incorporate a fabric, wick-type material with carburetors in order to increase the vaporization of the gasoline. For example, the U.S. Pat. No. 663,699, is directed to a carburetor in which gasoline is introduced onto an absorbent pad composed of alternate layers of felt and wire gauze. In this construction, the air being drawn to the engine passes through the saturated felt to provide the gas-air mixture.

U.S. Pat. No. 583,126 dated 1897, discloses a carburetor in which an absorbent material, such as a sponge, is located within a wire mesh casing and gasoline is absorbed into the sponge and the air being drawn to the engine passes over the saturated sponge.

U.S. Pat. No. 1,605,966 discloses a carburetor system in which an anti-knock liquid is introduced into the air stream ahead of the carburetor. A wick extends down into a container which contains the anti-knock fluid and the air passing over the wick will vaporize the liquid before it is sent to the carburetor.

SUMMARY OF THE INVENTION

The invention is directed to an improved carburetor for an internal combustion engine which eliminates the need for the conventional automatic choke mechanism. In accordance with the invention, a pair of fabric absorbent wicks are suspended in the vaporizing chamber of the carburetor in alignment with the high speed gasoline jets. The wicks are curved partially around the respective venturis and hang downwardly below the level of the venturis.

On starting of the engine a primer pump is manually activated to discharge slugs of gasoline through the jets into contact with the respective wicks to saturate the absorbent material. The absorbed gasoline is vaporized and then drawn, along with air into the engine. After starting of the engine, gasoline is drawn by engine vacuum from the reservoir in the carburetor and vaporized in the venturis in a conventional manner.

As a feature of the invention, a cup-shaped metal screen, formed of copper or the like, can be disposed within the central opening in each venturi and the screen serves to break up the gasoline into small droplets which aids in the vaporization of the gasoline.

With the carburetor of the invention, the automatic choke mechanism, as well as the conventional butterfly valve are eliminated. By eliminating the automatic choke mechanism the problems normally associated with the automatic choke are correspondingly eliminated and the overall cost of the carburetor is substantially reduced.

With the carburetor of the invention, the conventional accelerator pump for supplying gasoline through the high speed jets is not required. In place of the conventional accelerator pump, a manually operated primer pump is utilized to supply gasoline to the absorbent wicks when desired or on starting of the cold engine. By eliminating the accelerator pump, the cost of the carburetor is reduced, as well as improving gas mileage.

The carburetor of the invention also provides more efficient engine operation and decreases carbon build-up in the engine and the plugs, due to the fact that flooding of the engine is eliminated.

Other objects and advantages will appear in the course of the following description.

DESCRIPTION OF THE DRAWINGS

The drawings illustrate the best mode presently contemplated of carrying out the invention.

In the drawings:

FIG. 3 is a section taken along line 3—3 of FIG. 2; and

FIG. 4 is a section taken along line 4—4 of FIG. 2.

DESCRIPTION OF THE ILLUSTRATED EMBODIMENT

Figure 1:
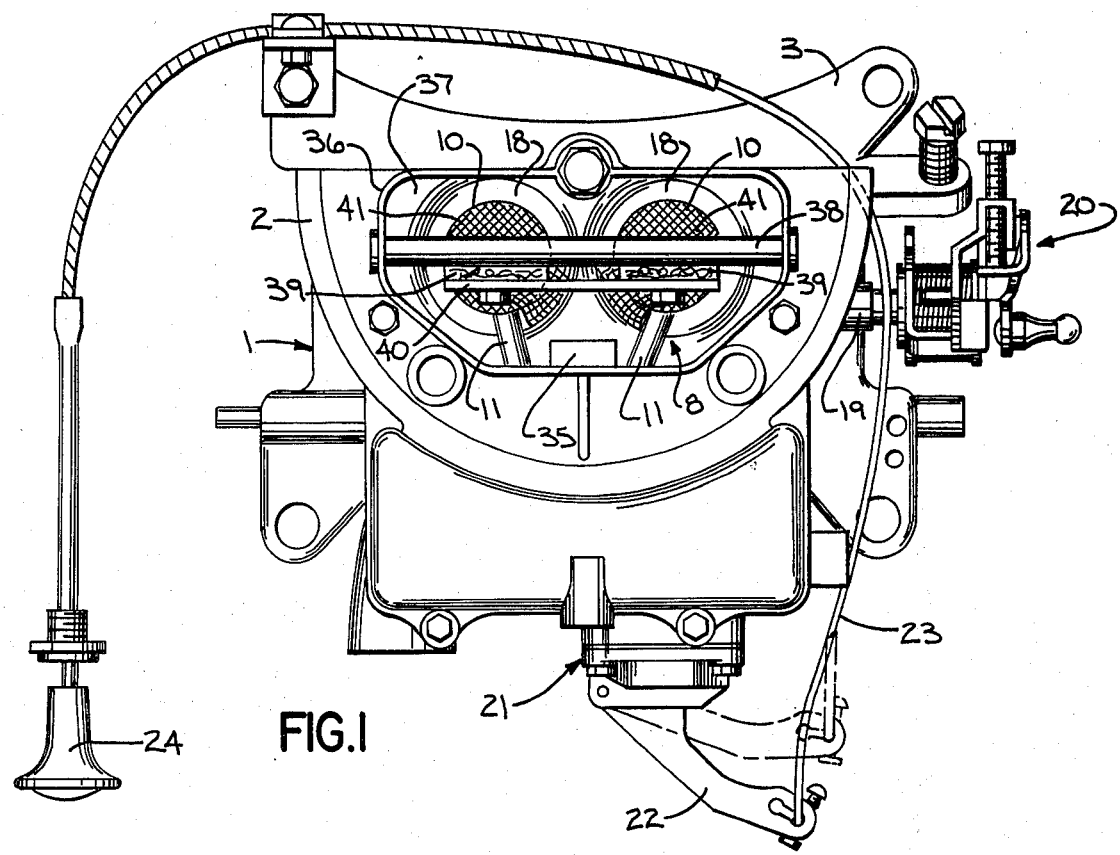
FIG. 1 is a top plan view of the carburetor of the invention.

The carburetor of the invention comprises a hollow body 1 which is enclosed by cover 2. The body 1 includes a base flange 3 that is bolted to the engine.

Body 1 defines a gasoline reservoir 4 and a vaporizing chamber 5 which is located in side-by-side relation with the reservoir 4. The level of gasoline in the reservoir 4 is controlled by a conventional float valve assembly 6 that operates a needle valve, not shown to regulate the flow of gasoline into the reservoir 4 through the inlet passage 7. The float assembly 6 is a conventional type and in itself forms no part of the present invention.

A booster-venturi assembly 8 is located within the chamber 5, and the assembly 8 includes a central portion 9 and a pair of venturis 10 are carried from the central portion through arms 11. Each arm 11 has a central passage 12 which communicates via passages 13 and 14 with reservoir 4, as best shown in FIG. 3. In addition, each passage 12 is connected to a passage 15 that communicates with hollow perforated tube 16 which is located in well 17. With this construction, vacuum created by engine operation will draw gasoline from the reservoir 4 through the passages 13 and 12 to the venturis 10 in a conventional manner.

The lower end of body 1 is provided with a pair of openings which communicate with chamber 5 and throttle plates 18 are adapted to control the discharge of gasoline-air mixture through the openings in a conventional manner. Throttle plates 18 are carried by throttle plate shaft 19 which, in turn, is connected through a conventional throttle plate linkage 20 to the engine throttle.

A diaphragm-type pump unit 21 is mounted on the outer surface of the body 1 and is operated through a pivotable arm 22. A cable 23 is connected to the outer end of the arm and extends to the passenger compartment of the automobile, where it terminates in a pull-knob 24 that can be mounted on the dash of the automobile, or on the steering column. By pulling outwardly on the knob 24, the arm can be pivoted to thereby operate the pump 21. The pump 21 is of conventional construction and port 25, as shown in FIG. 3, connects the reservoir 4 with the inlet of the pump. The outlet of pump 21 is connected to a passage 26 formed in the bottom of body 1, as illustrated in FIG. 3, and passage 26 communicates with the lower end of well 27 formed in central section 9 of the venturi assembly 8. Flow of gasoline through the vertical well 27 is controlled in a conventional manner by a ball check valve 28, and valve stem 29 rests against the ball valve 28 and extends upwardly within the hollow interior of a screw 30. As best shown in FIG. 3, the lower end of the screw 30 is threaded into an opening in the body 1 while the upper end of screw 30 projects into a central opening in the section 9. Gasoline being pumped by the pump 21 will unseat the ball valve 28 and flow upwardly through the hollow interior of the screw 30 for discharge through the holes 31 in the upper end of the screw. A pair of nozzle tubes 32 communicate with the openings 31 and terminate in a curved well or recess 33. Jets or openings 34 are formed in the outer wall of section 9 in alignment with nozzles 32 so that gasoline being discharged through the nozzles will pass through the jets 34, in a direction toward the respective venturis 10. A deflector plate 35 is carried by the screw 30 and serves to deflect the gasoline being discharged through the open upper end of the recess radially outward.

Cover 2 is provided with an outwardly extending flange 36 which defines an air inlet opening 37. Extending across the opening 37 is a shaft or support rod 38. In the carburetor of the invention, the conventional butterfly valve which is normally carried by rod 38 is eliminated.

Figure 2:
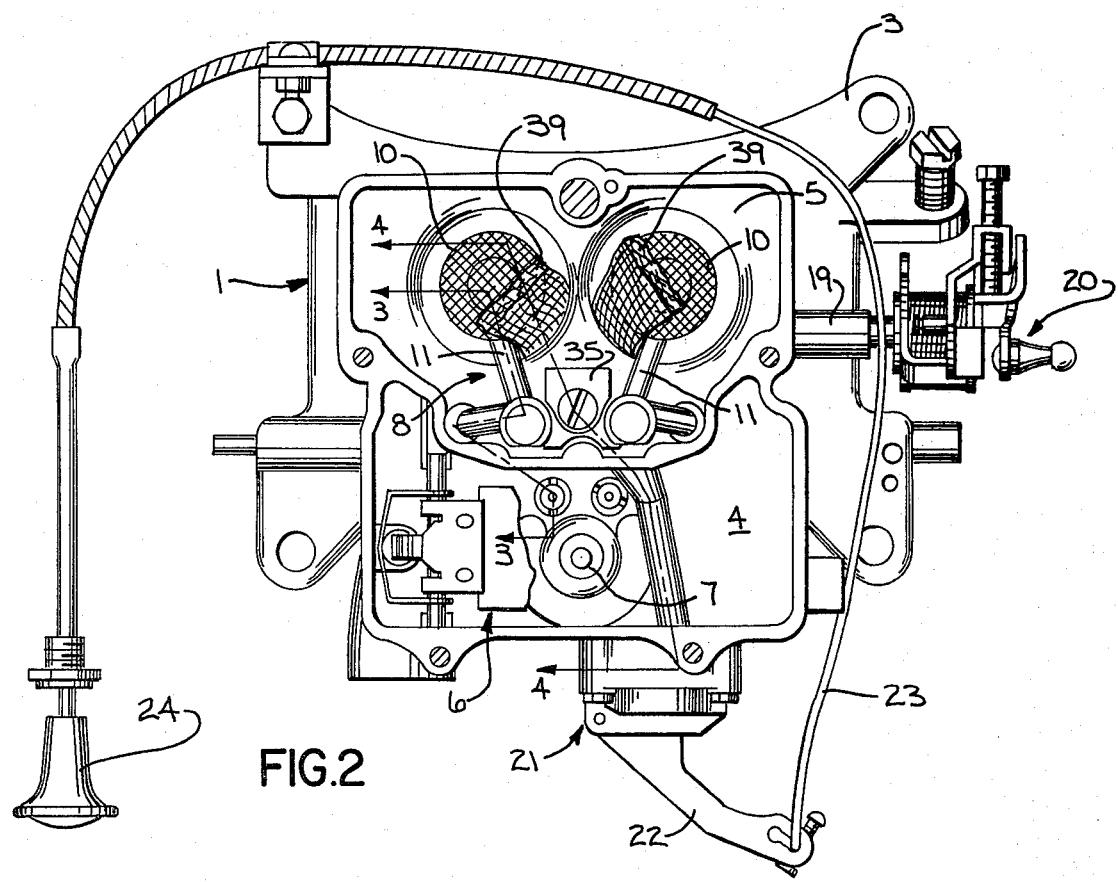
FIG. 2 is a view similar to FIG. 1 with the cover plate removed.

In accordance with the invention, a pair of absorbent fabric wicks 39 are suspended from the shaft 38 and extend downwardly between the venturis 10, as best shown in FIG. 2. The wicks 39 are mounted on the rod 38 through bar 40 which is screwed to the rod.

Each wick 39 is formed of an absorbent fabric, such as cotton or synthetic materials, and has a loop configuration with the free ends being secured to the rod 38 through bar 40. As shown in FIGS. 2 and 4, the wicks 39 are positioned immediately in alignment with the jets 34, so that the gasoline being discharged through the jets on operation of the primer pump 21 will be directed into contact with the wicks and absorbed within the wick material. The wicks also curve partially around the venturis 10, as shown in FIG. 2, and the lower looped end of each wick projects downwardly beyond the corresponding venturi, as shown in FIG. 4.

During normal operation of the engine, the gasoline being introduced into the venturis will be broken up into extremely small droplets by means of cup-shaped metal screens 41 which are mounted within the respective venturis 10, as shown in FIG. 3.

To start the cold engine, several pulls are made by the operator on the hand knob 24, thereby operating the pump 21 causing gasoline to be pumped through the jets 24 onto the wicks 39. The gasoline will be absorbed in and saturate the fabric wick material and the absorbed gasoline will be vaporized and drawn with air into the engine. After starting of the engine, gasoline will be drawn by the engine vacuum from reservoir 4 through passages 14, 13 and 12 to the venturis 10, where the gasoline is discharged through ports 42 into contact with screens 41. The screens 41 serve to break up the gasoline into small droplets so that it can be more easily vaporized.

By eliminating the automatic choke mechanism, as well as the accelerator pump and the butterfly valve, a considerably less expensive unit is achieved which is perhaps 40% cheaper in cost than a conventional carburetor. Furthermore, maintenance problems are minimized due to the elimination of these components.

While the above description has shown a manually operated primer pump 21, it is contemplated that in some installations the pump can be actuated by the accelerator in a conventional manner.

Various modes of carrying out the invention are contemplated as being within the scope of the following claims particularly pointing out and distinctly claiming the subject matter which is regarded as the invention.

I claim:
1. A carburetor for an internal combustion engine, comprising:
   a body defining an air-fuel mixing chamber and having an air inlet and having an outlet to discharge an air-fuel mixture to the engine,
   a venturi disposed within said chamber, and having an inlet end and an outlet end,
   first fuel supply means responsive to operation of the engine for supplying liquid fuel to said venturi,
   an absorbent member disposed within said chamber adjacent said inlet and composed of a material capable of absorbing said liquid fuel, said absorbent member extending alongside said venturi and terminating beyond the outlet of said venturi,
   a fuel jet in the chamber and disposed in direct alignment with said absorbent member,
   second fuel supply means for supplying liquid fuel to said jet, said fuel being discharged from said jet into contact with said absorbent member and being absorbed in said material, and
   operating means for operating said second fuel supply means to supply fuel through said jet.

2. The carburetor of claim 1, wherein said absorbent member is a fabric wick.

3. The carburetor of claim 1, and including a foraminous member disposed within the venturi to aid in breaking up the droplets of liquid fuel.

4. The carburetor of claim 3, wherein said foraminous member is a metal screen.

5. The carburetor of claim 4, wherein said metal screen includes a generally cylindrical section disposed along the inner surface of said venturi and an end section disposed across the outlet end of said venturi.

6. The carburetor of claim 1, wherein said second fuel supply means includes a fuel reservoir in said body, conduit means connecting said reservoir and said jet, and pumping means disposed in said conduit means, said operating means includes a manually operable member connected to said pumping means for operating said pumping means to supply fuel from said reservoir to said jet.

7. The carburetor of claim 6, and including a support disposed at said inlet, said wick being suspended from said support.

8. The carburetor of claim 7, wherein said wick is U-shaped having a pair of free ends connected to said support and having a reverse bent portion extending downwardly to a level below the outlet of said venturi.

9. In a carburetor for an internal combustion engine, a body defining an air-fuel mixing chamber and having an air inlet and having an outlet to discharge an air-fuel mixture to the engine, a support disposed within said air inlet, a fuel outlet jet in said chamber, fuel supply means for supplying liquid fuel to said jet, fuel absorbing means suspended from said support and disposed within the chamber in the path of air entering said air inlet, said fuel absorbing means being in direct alignment with said jet wherby fuel being discharged from said jet will impinge on said fuel absorbing means and be absorbed therein, said fuel absorbing means comprising a generally U-shaped fibrous wick having a pair of free ends connected to said support and having a reverse bent lower portion, and operating means for operating said fuel supply means for supplying fuel through said jet and into impingement with said fuel absorbing means, the absorbed fuel being vaporized and mixing with said air to provide a fuel-air mixture for delivery to the engine.

10. The carburetor of claim 9, wherein said air inlet is free of closure.

* * * * *